[19] United States Patent
Spicer et al.

[11] 4,148,767
[45] Apr. 10, 1979

[54] INK FOR DRY PLANOGRAPHIC PRINTING

[75] Inventors: Leonard A. Spicer, Ilford; Derek J. McGee, Henham, both of England

[73] Assignee: Gestetner Limited, London, England

[21] Appl. No.: 837,863

[22] Filed: Sep. 29, 1977

[30] Foreign Application Priority Data

Sep. 29, 1976 [GB] United Kingdom ............... 40431/76

[51] Int. Cl.² .................... C09D 3/42; C09D 3/56; C09D 11/02
[52] U.S. Cl. ................................ 260/22 TN; 101/450; 106/14.5; 106/29; 260/225; 260/DIG. 38
[58] Field of Search ........ 260/22 S, 22 TN, DIG. 38; 101/450; 106/14.5, 29

[56] References Cited

U.S. PATENT DOCUMENTS

| | | | |
|---|---|---|---|
| 3,015,637 | 1/1962 | Rauner et al. | 260/22 S |
| 3,075,941 | 1/1963 | Wynstra et al. | 260/22 S |
| 3,125,540 | 3/1964 | Loew et al. | 260/22 S |
| 3,450,791 | 6/1969 | Sekmakas et al. | 260/22 S |
| 3,945,957 | 3/1976 | Noshiro et al. | 260/22 S |
| 3,948,827 | 4/1976 | Noshiro et al. | 260/22 S |
| 3,951,063 | 4/1976 | Schank | 101/450 |

FOREIGN PATENT DOCUMENTS

| | | |
|---|---|---|
| 445242 | 5/1971 | Australia. |
| 712754 | 7/1968 | Belgium. |
| 2249142 | 5/1975 | France. |
| 2249143 | 5/1975 | France. |
| 2276942 | 1/1976 | France. |
| 2551746 | 6/1976 | Fed. Rep. of Germany ........... 101/450 |
| 405603 | 5/1932 | United Kingdom. |
| 694716 | 7/1953 | United Kingdom. |
| 699513 | 11/1953 | United Kingdom. |
| 868122 | 5/1961 | United Kingdom. |
| 979273 | 1/1965 | United Kingdom. |
| 1303649 | 1/1973 | United Kingdom. |

OTHER PUBLICATIONS

The American Ink Maker, Apr. 1948, J. R. Patterson: "Silicones for Printing Ink", 4 pages.
Research Disclosure, Oct. 1973, Havant, Hampshire, p. 11, disclosure no. 11407, "Improved Ink for Waterless Lithographic Plates".

*Primary Examiner*—Ronald W. Griffin
*Attorney, Agent, or Firm*—Cushman, Darby & Cushman

[57] ABSTRACT

The invention provides a novel ink for dry planographic printing. The new ink is based on a vehicle containing the reaction product of an oil-modified alkyd resin, a rosin-modified phenolic resin, and a diisocyanate and also a high viscosity silicone oil. The new ink can be used with planographic plates having an oleophobic surface and does not adhere to the non-image areas.

8 Claims, No Drawings

INK FOR DRY PLANOGRAPHIC PRINTING

This invention relates to planographic printing, and in particular to planographic printing systems operated without the use of fountain solution.

In conventional planographic printing (lithography), the image on the printing plate is not raised, or only very slightly raised, above the surrounding surface of the plate, and in use the image, which is oleophilic, attracts the greasy printing ink, while the non-image areas, which are hydrophilic, repel the ink. In order to maintain the non-image areas in a hydrophilic and ink-repellent condition, the plate is periodically wetted with an aqueous mixture, called fountain solution, which serves to prevent pick-up of ink by the non-image areas. Since the application of the fountain solution to the plate requires the provision of special apparatus in the printing machine, and the control of this apparatus calls for a certain amount of judgement and experience on the part of the operator, it is clearly desirable to be able to provide a system of planographic printing in which the need for fountain solution is removed.

One way of doing this is to provide a plate which has a surface which is so repellent to the ink that the latter will not stick to it even if no fountain solution is used. A number of proposals to make plates of this kind have been made, mostly depending upon coating the plate with a layer based on a silicone or a fluorinated compound. Since lithographic inks have only a low affinity for oleophobic materials such as silicones and fluorinated compounds, these proposals have met with a certain amount of success, but there is still substantial room for improvement both in ensuring adequate adhesion of the image to the ink repelling surface of the plate, and in ensuring complete absence of any ink pick-up in the non-image areas.

In addition to modifying the plate surface, it is also possible in systems of this kind, to modify the ink used in the printing process so that its affinity for the non-image areas of the plate is as low as possible, while it still retains a satisfactory degree of adhesion to the image.

We have now found that a planographic printing ink may be made having a very low affinity for oleophobic non-image areas of a planographic plate for use in dry planographic printing combined with good adhesion to the image areas, which comprises a dispersion of pigment with or without a toner in a substantially non-aqueous vehicle comprising the reaction product of (1) an oil-modified alkyd resin, (2) a rosin-modified phenolic resin, and (3) a diisocyanate, having, finely and uniformly dispersed therein a small amount, i.e. 0.2 to 1% by weight of the vehicle, of a silicone oil having a viscosity of at least 1,000 centistokes at 20° C. which is immiscible or only partly miscible with the ink vehicle. Such inks have very low affinity for the oleophobic background of planographic printing plates for use in dry planographic printing, and especially for the plates described in our copending application Ser. No. 837,864, filed Sept. 29, 1977.

The low affinity of such inks for the non-image areas of the plate is due in part to the presence of the high viscosity silicone oil immiscible or only partly miscible with the ink vehicle. This oil is preferably a dimethylpolysiloxane oil. "Partly miscible" means "soluble in vehicle to the extent of not more than 0.2% by weight at 20° C." The optimum amount of the silicone oil to add, which depends inter alia on the viscosity of the oil, can be found by experiment. Too thin or too little gives no advantage, while too thick or too much may cause the ink to lose affinity for the image are as as well as the non-image areas. It has been found that 0.3–0.8% of an oil of 1000–10000 centistokes at 20° C. usually gives the best improvement in the inks. The mode of action is not fully understood, but the silicone oil is believed to form with the other ingredients of the ink a two-phase system in which during use of the ink the silicone is forced onto the surface of the plate by the shearing action of the ink distributor rollers.

The oil-modified alkyd resin may be, for example, an alkyd resin made by the reaction of a polyhydric alcohol such as glycerol, pentaerythritol or trimethylolpropane with isophthalic and/or phthalic acid modified by reaction with an appropriate drying oil or polyunsaturated fatty acids derived therefrom such as linseed oil or soya bean oil or linseed oil fatty acids.

The rosin-modified phenolic resin may be a material of known kind made for inclusion in inks and other surface coating compositions. The diisocyanate is preferably toluene diisocyanate but any other diisocyanate known for use in surface coating compositions may be used.

The proportions of the aforesaid materials are preferably: drying oil or fatty acids therefrom 40–65%, alkyd resin 4–24%, rosin-modified phenolic resin 10–45%, and diisocyanate 4–15%, the percentages being by weight.

The materials are mixed and, if necessary, cooked together in conventional manner until a homogeneous mixture is obtained, preferably as a solution in an appropriate solvent containing, for example, 30 to 70% by weight solids. Ready-made solutions of such products suitable for use in the invention are available commercially.

To produce an ink in accordance with the present invention, a vehicle of this kind is mixed with the silicone oil and with appropriate pigments and toners, for example carbon black and a blue toner, which are then ground into the vehicle in known manner.

In order to ensure thorough dispersion of the silicone oil through the vehicle, it is preferred to stir the oil into three times its weight of a molten animal or vegetable wax having a melting point in the range 45°–90° C. e.g. beeswax, carnauba wax, candelilla wax or preferably spermaceti. After cooling an amount of the resulting mixture containing the required amount of the silicone oil is stirred into the vehicle at 90° C. The finished ink may then contain 0.6 to 3% by weight of the vehicle of such a wax.

The carbon black and any other colouring materials are then added and the mixture is milled, e.g. on a water-cooled triple roll mill. The wax dissolves in the vehicle leaving the silicone oil as a very finely divided and uniformly dispersed discontinuous phase.

The inks of the present invention may be used in dry planographic printing in the same way as inks previously proposed for this purpose and give excellent results, especially when they are used with the novel kind of plate described in our aforesaid copending Application.

The invention therefore includes within its scope a method of dry planographic printing which comprises imaging a planographic printing plate having an oleophobic surface with an ink-accepting image, applying an ink of the present invention to the imaged plate, and printing from the inked plate. Preferably, the plate is imaged with a heat-fixable toner, based e.g. on polystyrene, applied by a xerographic method, which is fixed by fusing the toner, preferably using a heated roller or other method in which both heat and pressure are used to fuse the toner. No special precautions, in particular no fountain solution, are required to prevent the ink of the present invention adhering to the non-image areas of the plate. Conventional lithographic printing equipment can be used, except that the apparatus for applying the fountain solution can be dispensed with.

The following are Examples of inks which illustrate the present invention, the ink of Example 1 being outside the scope of the invention and producing only 30 copies in printing tests wherein the inks of Examples 2 and 3 gave 100 copies each, while Examples 4 to 6 are preferred.

EXAMPLES 1 to 3

Inks were produced from the following ingredients. The parts are by weight.

| Ingredient | Example 1 | Example 2 | Example 3 |
|---|---|---|---|
| Carbon black (Mogul L) | 25 | 25 | 25 |
| Heydovar 1 | 73.5 | 74.25 | 74.25 |
| Viscasil 5000 | 1.5 | 0.75 | — |
| Viscasil 10000 | — | — | 0.75 |

Heydovar 1 is a solution of the reaction product of soya bean oil-modified alkyd resin based on isophthalic acid and pentaerythritol, a rosin-modified phenolic resin, and toluene diisocyanate in the proportions 42% oil, 10% alkyd resin (isophthalic acid to pentaerythritol ratio 4:6), 40% resin, and 8% diisocyanate, in printing oil distillate having a solids content of 55% by weight, manufactured by Croda Ltd.

Viscasil 5000 and Viscasil 10000 are dimethylpolysiloxane oils sold by General Electric Company of U.S.A.

In each case, the Viscasil is stirred into the Heydovar, initially at 90° C. until it has cooled to 40° C. The carbon black is then mixed in and the ink milled on a triple roll mill with water cooling.

EXAMPLE 4

| | |
|---|---|
| Linseed oil | 45.8 |
| Toluene diisocyanate | 8.4 |
| Alkyd resin | 5.0 |
| Mitchanol 31 (rosin-modified phenolic resin) | 14.8 |
| Mogul L (Carbon black) | 24.0 |
| Wax (Spermaceti) | 1.5 |
| Silicone oil 1000 cs | 0.5 |
| | 100.0 |

EXAMPLES 5 and 6

| | Example 5 | Example 6 |
|---|---|---|
| Linseed oil | 26.9 | 27.6 |
| Rosin-modified phenolic resin pre-reacted with toluene diisocyanate | 31.9 | 32.6 |
| Alkyd resin | 12.1 | 12.3 |
| Mitchanol 31 | 3.7 | 1.9 |
| Mogul L | 24.2 | 24.0 |
| Wax (Spermaceti) | 0.9 | 1.2 |
| Silicone oil 1000 cs | 0.3 | 0.4 |
| | 100.0 | 100.0 |

The linseed oil, alkyd resin and phenolic resins are mixed together. Separately, the silicone oil is stirred into the spermaceti while the latter is molten. After cooling, the mixture obtained is stirred into the vehicle at 90° C., followed by the carbon black. While still warm, the ink is milled on a water-cooled triple roll mill. The wax dissolves in the varnish, thus releasing the silicone.

Each of these inks may be used in the manner described above.

We claim:

1. An ink for dry planographic printing comprising a dispersion of pigment in a substantially non-aqueous vehicle comprising the reaction product of 40–65% of a drying oil or fatty acids derived therefrom, 4–24% of alkyd resin, 10–45% of rosin-modified phenolic resin, and 4–15% of diisocyanate, the percentages being by weight of the vehicle, the said ink having, finely and uniformly dispersed therein, 0.2 to 1% by weight of the ink of a silicone oil having a viscosity of at least 1000 centistokes at 20° C. which is immiscible or only partly miscible with the said vehicle.

2. An ink according to claim 1 in which the said vehicle comprises the reaction product of soya bean oil or linseed oil, an alkyd resin derived from isophthalic acid or phthalic acid and pentaerythritol or glycerol, a rosinmodified phenolic resin, and toluene diisocyanate.

3. An ink according to claim 1 in which the silicone oil is a dimethylpolysiloxane oil having a viscosity of 1000 to 10,000 centistokes at 20° C.

4. An ink according to claim 1 which also contains 0.6 to 3% by weight of the ink of an animal or vegetable wax soluble in said vehicle and having a melting point of 45° to 90° C.

5. Process for the preparation of an ink as claimed in claim 1 which comprises mixing the silicone oil in an animal or vegetable wax having a melting point of 45° to 95° C. while the latter is in the molten state, the said wax being soluble in the said vehicle, allowing the wax to solidify, dispersing the solid mixture of wax and silicone oil in the vehicle while the latter is at elevated temperature, and milling the pigment into the vehicle thereby to produce the ink having the silicone oil finely and uniformly dispersed therein.

6. A method of dry planographic printing which comprises imaging a planographic printing plate having an oleophobic surface with an ink-accepting image, applying an ink as claimed in claim 1 to the imaged plate, and printing from the inked plate.

7. A method according to claim 6 in which the said plate carries an image of a fused toner applied thereto by an electrophotographic method.

8. A method according to claim 7 in which the said toner is a polystyrene-based or styrene copolymer resin-based toner.

* * * * *